United States Patent
Chang et al.

(10) Patent No.: US 12,345,897 B2
(45) Date of Patent: Jul. 1, 2025

(54) GLARE MITIGATION MODULE FOR A HEAD-UP DISPLAY SYSTEM

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 705 days.

(21) Appl. No.: 17/700,920

(22) Filed: Mar. 22, 2022

(65) Prior Publication Data

US 2023/0305311 A1    Sep. 28, 2023

(51) Int. Cl.
*G02B 27/42*    (2006.01)
*B60K 35/00*    (2024.01)
(Continued)

(52) U.S. Cl.
CPC .......... *G02B 27/4233* (2013.01); *B60K 35/00* (2013.01); *G02B 5/1861* (2013.01);
(Continued)

(58) Field of Classification Search
CPC ............ G02B 27/4233; G02B 27/0101; G02B 27/4244; G02B 27/425; G02B 27/42;
(Continued)

(56) References Cited

U.S. PATENT DOCUMENTS 10,379,612 B1    8/2019    Bonnier et al.
10,823,963 B2    11/2020   Banyay et al.
(Continued)

FOREIGN PATENT DOCUMENTS

CN    106004443 A         10/2016
DE    102017206365 A1 *   10/2018

OTHER PUBLICATIONS

F. Bruder, T. Facke, T. Rolle, The Chemistry and Physics of Bayfol HX Film Holographic Photopolymer, 2017, p. 1-36 Polymers, Leverkusen, Germany.
U.S. Appl. No. 17/481,900; Inventors: Thomas A. Seder, Kai-Han Chang, filed Sep. 22, 2021; 20 pages.

*Primary Examiner* — Stephone B Allen
*Assistant Examiner* — Adam W Booher
(74) *Attorney, Agent, or Firm* — Vivacqua Crane, PLLC (57) ABSTRACT

A glare mitigation module for a head-up display system is configured to transmit display light emitted from an illumination device therethrough. The glare mitigation module comprises an input surface through which the display light from the illumination device enters the glare mitigation module and an output surface through which the display light from the illumination device exits the glare mitigation module in a display direction. The glare mitigation module further comprises a diffractive optical element comprising a plurality of layers stacked successively between the input and output surfaces, with the plurality of layers arranged to transmit the display light of the illumination device therethrough and to diffract an external light that enters the glare mitigation module through the output surface. The diffractive optical element is arranged to diffract the external light in a diffracted direction away from eyes of an occupant.

19 Claims, 8 Drawing Sheets

(51) Int. Cl.
  *B60K 35/23*   (2024.01)
  *B60K 35/40*   (2024.01)
  *G02B 5/18*    (2006.01)
  *G02B 27/01*   (2006.01)

(52) U.S. Cl.
  CPC .......... *G02B 27/0101* (2013.01); *B60K 35/23* (2024.01); *B60K 35/415* (2024.01); *B60K 2360/333* (2024.01); *G02B 2027/0118* (2013.01)

(58) Field of Classification Search
  CPC .. G02B 27/01; G02B 27/0103; G02B 5/1861; G02B 5/203; G02B 5/18; G02B 5/1814; G02B 5/1857; G02B 5/32; G02B 2027/0118; G02B 2027/0105; G02B 2027/0109; G02B 26/0808; B60K 35/00; B60K 35/415; B60K 35/23; B60K 35/231; B60K 35/232; B60K 35/233; B60K 35/234; B60K 35/235; B60K 2360/333
  See application file for complete search history.

(56) References Cited

U.S. PATENT DOCUMENTS

| | | |
|---|---|---|
| 2012/0224062 A1* | 9/2012 | Lacoste .................... G09G 5/14 348/148 |
| 2015/0236302 A1 | 8/2015 | Gyoung et al. |
| 2015/0268399 A1 | 9/2015 | Futterer |
| 2016/0209647 A1 | 7/2016 | Fürsich |
| 2016/0327906 A1 | 11/2016 | Futterer |
| 2017/0045740 A1 | 2/2017 | Hirata et al. |
| 2017/0184844 A1 | 6/2017 | Matsushita |
| 2017/0248747 A1 | 8/2017 | Kim et al. |
| 2018/0181067 A1 | 6/2018 | Hasedzic et al. |
| 2019/0094803 A1 | 3/2019 | Futterer |
| 2019/0171014 A1 | 6/2019 | Chen et al. |
| 2019/0243140 A1 | 8/2019 | Erler |
| 2020/0088996 A1 | 3/2020 | Fu et al. |
| 2020/0159013 A1 | 5/2020 | Hirata et al. |
| 2020/0192282 A1 | 6/2020 | Kim et al. |
| 2020/0349836 A1 | 11/2020 | Shibata et al. |
| 2020/0400869 A1 | 12/2020 | Asami et al. |
| 2021/0067769 A1 | 3/2021 | Frederiksen et al. |
| 2021/0303851 A1* | 9/2021 | Dodson .................... G06V 20/10 |
| 2022/0107501 A1 | 4/2022 | Muravev et al. |
| 2022/0357574 A1 | 11/2022 | Chang et al. |

\* cited by examiner

|  | Layer 1 | Layer 2 | Layer 3 | Layer 4 |
|---|---|---|---|---|
| Grating Periodicity Λ (um) | 0.8 | 1 | 1.2 | 1.4 |
| Wavelength λ (um) | 0.4 | 0.5 | 0.6 | 0.7 |
| Bragg Angle ($\theta_B$) (deg) | 49.59407 | 49.59407 | 49.59407 | 49.59407 |
| Delta n | 0.01 | 0.01 | 0.01 | 0.01 |
| Thickness d (μm) | 50 | 50 | 50 | 50 |
| Navg | 1.5 | 1.5 | 1.5 | 1.5 |
| Grating phi (Φ) (deg) | 130 | 130 | 130 | 130 |
| rho | 16.66667 | 16.66667 | 16.66667 | 16.66667 |
| Q | 130.8997 | 104.7198 | 87.26646 | 74.79983 |
| K | 7.853982 | 6.283185 | 5.235988 | 4.48799 |
| Beta | 23.56194 | 18.84956 | 15.70796 | 13.46397 |

GLARE MITIGATION MODULE FOR A HEAD-UP DISPLAY SYSTEM

INTRODUCTION

The present disclosure relates to a head-up display system, and more particularly to a glare mitigation module for a head-up display system.

In recent years, head-up display systems have seen increased use in vehicles. These systems provide information to the driver of the vehicle in a transparent display (typically the windshield) aligned with the driver's field of vision out of the vehicle, which prevents the occupant from having to divert their attention away from the road to view the information. The use of head-up displays reduces distracted driving and improves the safety of operating the vehicle. When sunlight enters the vehicle and reflects off the last optical element in head-up display (before windshield), the reflected sunlight often parallel to the light emitted by the head-up display having the information for the driver. As such, the sunlight glare enters the eyes of the driver and reduces the visibility of the head-up display graphics. Often, these systems use a curved cover lens to focus the sunlight to a focal bar spaced from the eyes of the driver. While useful, the curved cover lens consumes a large packaging space within the vehicle.

Thus, while current head-up display systems achieve their intended purpose, there is a need for a new head-up display system that addresses these issues.

SUMMARY

According to several aspects of the present disclosure, a glare mitigation module is used with a head-up display system and configured to transmit a display light emitted from an illumination device therethrough. The glare mitigation module comprises an input surface through which the display light from the illumination device enters the glare mitigation module and an output surface through which the display light from the illumination device exits the glare mitigation module in a display direction. The glare mitigation module further comprises a diffractive optical element comprising a plurality of layers stacked successively between the input and output surfaces, with the plurality of layers arranged to transmit the display light of the illumination device therethrough and to diffract an external light that enters the glare mitigation module through the output surface. The diffractive optical element is arranged to diffract the external light in a diffracted direction away from eyes of an occupant.

In one aspect, each of the plurality of layers is arranged to have a diffraction angle and configured to interact with the external light entering the glare mitigation module within a range of incident angles and diffract the external light within a range of diffraction angles.

In another aspect, each of the plurality of layers varies from the other layers in at least one of a grating angle, a periodicity, a refractive index modulation, and a thickness.

In another aspect, the input surface and the output surface are substantially parallel.

In another aspect, each of the input and output surfaces has a planar configuration.

In another aspect, the layers extend substantially parallel to one another and the input and output surfaces.

In another aspect, the layers of the diffractive optical element comprises a polymer that is transparent at visible wavelength.

In another aspect, the layers of the diffractive optical element are integrally formed of a unitary material.

In another aspect, the unitary material comprises a photopolymer, with each of the layers within the unitary material independently processed to form the diffractive optical element.

In another aspect, the layers are formed separately and assembled successively to form the diffractive optical element.

In another aspect, adjacent layers are bonded to one another with an optically clear adhesive having a refractive index substantially equal to an average refractive index of the diffractive optical element.

According to several aspects of the present disclosure, a head-up display system of a vehicle for visually transmitting information to eyes of an occupant. The head-up display system further comprises an illumination device configured to emit a display light and a glare mitigation module spaced from the illumination device and configured to transmit the display light from the illumination device therethrough. The glare mitigation module comprises an input surface through which the display light from the illumination device enters the glare mitigation module and an output surface through which the display light from the illumination device exits the glare mitigation module in a display direction. The glare mitigation module further comprises a diffractive optical element comprising a plurality of layers stacked successively between the input and output surfaces, with the plurality of layers arranged to transmit the display light of the illumination device therethrough and to diffract an external light that enters the glare mitigation module through the output surface. The diffractive optical element is arranged to diffract the external light in a diffracted direction away from the eyes of the occupant for preventing reflection of the external light toward the eyes of the occupant.

In one aspect, the head-up display system further comprises a spatial light modulator proximate the illumination device and arranged to receive the display light emitted from the illumination device, impose a holographic image on the display light, and transmit the display light toward the glare mitigation module.

In another aspect, the head-up display system further comprises a pupil replicator arranged to receive the display light emitted from the illumination device, replicate the display light into a plurality of display light, and transmit the plurality of display light parallel to one another toward the glare mitigation module.

In another aspect, the head-up display system further comprises a windshield spaced from the glare mitigation module extending transverse to the display direction of the display light exiting the glare mitigation module to reflect the display light toward the eyes of the occupant.

In another aspect, the illumination device is further defined as a laser, with the display light emitted by the laser being coherent.

In another aspect, each of the plurality of layers is arranged to have a diffraction angle and configured to interact with the external light entering the glare mitigation module within a range of incident angles and reflect the external light within a range of diffraction angles.

In another aspect, each of the plurality of layers varies from the other layers in at least one of a grating angle, a periodicity, a refractive index modulation, and a thickness.

According to several aspects of the present disclosure, a head-up display system of a vehicle for visually transmitting information to eyes of an occupant, comprising an illumination device configured to emit a display light. The head-up display system further comprises a glare mitigation module spaced from the illumination device and configured to transmit the display light from the illumination device therethrough. The glare mitigation module comprises an input surface through which the display light from the illumination device enters the glare mitigation module and an output surface through which the display light from the illumination device exits the glare mitigation module in a display direction. The glare mitigation module further comprises a diffractive optical element comprising a plurality of layers stacked successively between the input and output surfaces, with the plurality of layers arranged to transmit the display light of the illumination device therethrough and to diffract an external light that enters the glare mitigation module through the output surface. The diffractive optical element is arranged to diffract the external light in a diffracted direction away from the eyes of the occupant for preventing reflection of the external light toward the eyes of the occupant. The head-up display system further comprises a spatial light modulator proximate the illumination device and arranged to receive the display light emitted from the illumination device, impose a holographic image on the display light, and transmit the display light toward the glare mitigation module. The head-up display system further comprises a windshield spaced from the glare mitigation module extending transverse to the display direction of the display light exiting the glare mitigation module to reflect the display light toward the eyes of the occupant. Each of the plurality of layers is arranged to have a diffraction angle and configured to interact with the external light entering the glare mitigation module within a range of incident angles and reflect the external light within a range of diffraction angles. The layers of the diffractive optical element are integrally formed of a unitary material comprising a photopolymer, with each of the layers independently processed to form the diffractive optical element.

In one aspect, the head-up display system further comprises a pupil replicator arranged to receive the display light emitted from the illumination device, replicate the display light into a plurality of display light, and transmit the plurality of display light parallel to one another toward the glare mitigation module.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a graph showing the diffraction efficiency of each layer of the glare mitigation module of FIG. 5, relative to the incident angle of the external light that the glare mitigation module was designed for.

FIG. 8 is a graph showing the diffraction angle of the external light for each layer of the glare mitigation module of FIG. 5, relative to the incident angle of the external light that the glare mitigation module was designed for.

DETAILED DESCRIPTION

The following description is merely exemplary in nature and is not intended to limit the present disclosure, application, or uses.

Figure 1:
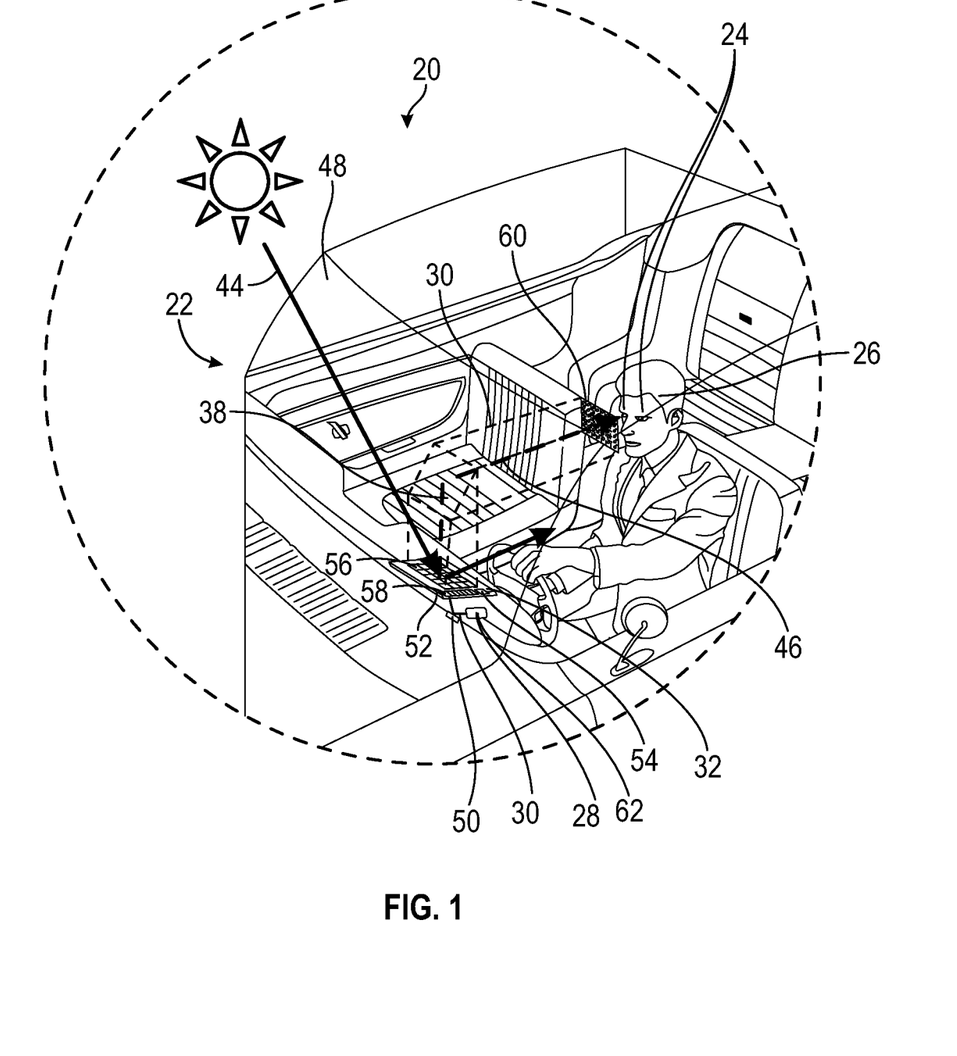
FIG. 1 is a schematic view of one example of a vehicle comprising a head-up display system including a controller, an illumination device emitting a display light toward eyes of an occupant and a glare mitigation module configured to reflect eternal light away from the eyes.

Referring to FIG. 1, a head-up display system is shown generally at 20.

The head-up display system 20 is configured for use with a vehicle 22. The head-up display system 20 visually transmits information to eyes 24 of an occupant 26. In one example, the occupant 26 is positioned within the vehicle 22 to operate the vehicle 22 (as shown in FIG. 1). As such, the head-up display system 20 may be arranged to transmit information to the occupant 26 that is positioned within the vehicle 22 to operate the vehicle 22 (i.e., sitting on a driver's seat within the vehicle 22). In other examples, the head-up display system 20 may be arranged to transmit information to the occupant 26 that is positioned within the vehicle 22 as a passenger. The occupant 26 as a passenger may be positioned in any suitable location within the vehicle 22 (i.e., first row, second row, third row, etc.).

Figure 2:
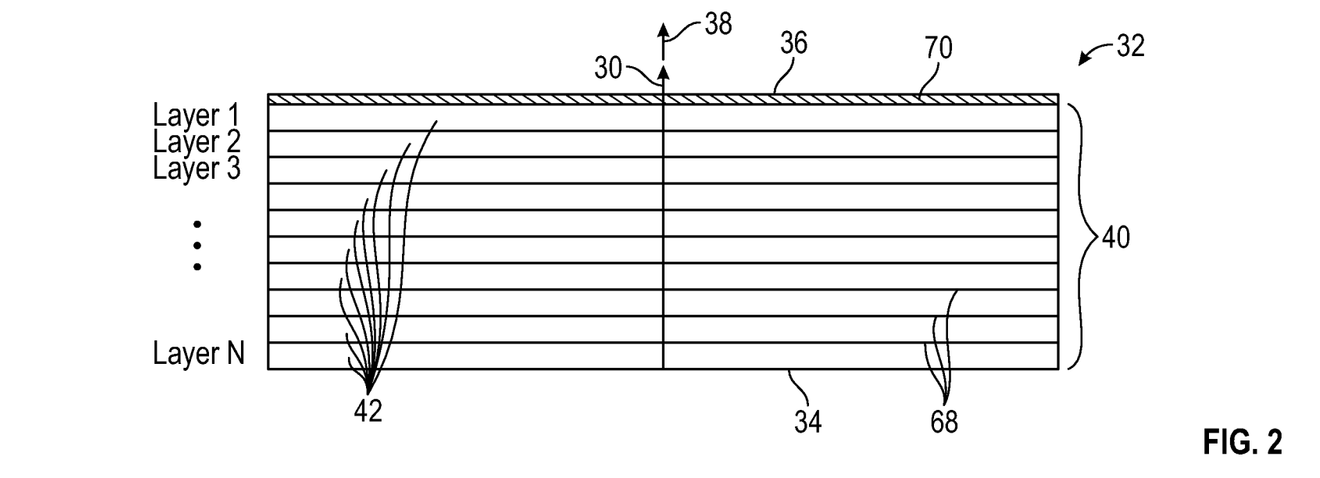
FIG. 2 is a cross-sectional view of one example of the glare mitigation module showing layers bonded together by an adhesive.
Figure 3:
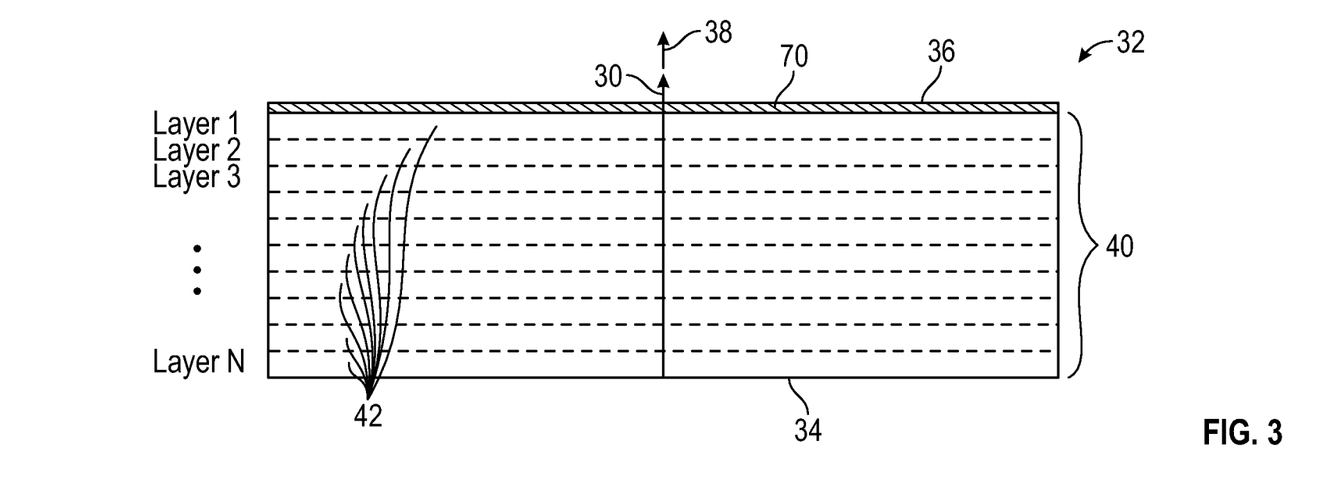
FIG. 3 is a cross-sectional view of one example of the glare mitigation module showing the layers integrally formed of a unitary material.

The head-up display system 20 comprises an illumination device 28 configured to emit a display light 30 and a glare mitigation module 32 spaced from the illumination device 28 and configured to transmit the display light 30 from the illumination device 28 therethrough. As shown in FIGS. 2 and 3, the glare mitigation module 32 comprises an input surface 34 through which the display light 30 from the illumination device 28 enters the glare mitigation module 32 and an output surface 36 through which the display light 30 from the illumination device 28 exits the glare mitigation module 32 in a display direction 38. The glare mitigation module 32 further comprises a diffractive optical element 40 comprising a plurality of layers 42 stacked successively between the input and output surfaces 34, 36, with the plurality of layers 42 arranged to transmit the display light 30 of the illumination device 28 therethrough and to diffract an external light 44 that enters the glare mitigation module 32 through the output surface 36 (see FIGS. 1 and 4). In one example, the external light 44 is sunlight that is transmitted directly from the sun or reflected off a surface outside of the vehicle 22. However, the external light 44 may be from any other light source positioned outside the vehicle 22, such as a streetlight. As shown in FIG. 1, the diffractive optical element 40 is arranged to diffract the external light 44 in a diffracted direction 46 away from the eyes 24 of the occupant 26 for preventing reflection of the external light 44 toward the eyes 24 of the occupant 26.

The transmission of the display light 30 in the display direction 38 results in the display light 30 reaching the eyes 24 of the occupant 26. The transmission of the external light 44 in the diffracted direction 46, results in the external light 44 being directed away from the eyes 24 of the occupant 26, preventing glare to the occupant 26 that overlaps the display light 30. The overlapping glare reduces the contrast of the display light 30, making it difficult for the occupant 26 to determine the information being presented in the display light 30.

The information presented to the occupant 26 within the display light 30 may pertain to the operation of the vehicle 22, such as the vehicle's velocity, direction of travel, engine revolutions per minute, fuel level, battery state of charge, navigational instructions, blind-spot indication, interior and exterior temperatures, weather indications, indication of obstacles, comfort controls, radio settings, just to name a few. However, the information may pertain to any suitable topic or subject that may be displayed to occupant 26.

The head-up display system 20 may further comprise a windshield 48 spaced from the glare mitigation module 32 and extending transverse to the display direction 38 of the display light 30 exiting the glare mitigation module 32 to reflect the display light 30 toward the eyes 24 of the occupant 26. In the example shown in FIG. 1, the windshield 48 is positioned above the glare mitigation module 32 and the illumination device 28. As such, the display light 30 transmits upwardly in the display direction 38 toward the windshield 48. The positioning of the windshield 48 transverse to the display direction 38 facilitates reflection of display light 30 off of windshield 48 and toward the eyes 24 of the occupant 26.

The head-up display system 20 may further comprise a spatial light modulator (SLM) 50 proximate the illumination device 28 and arranged to receive the display light 30 emitted from the illumination device 28, impose a holographic image on the display light 30, and transmit the light toward the glare mitigation module 32. The SLM 50 may modulate the intensity of the display light 30. In another example, the SLM 50 modulates the phase of the display light 30. In another example, the SLM 50 modulates both the intensity and the phase simultaneously.

In the example shown in FIG. 1, the SLM 50 is spaced from both the illumination device 28 and the glare mitigation module 32. The SLM 50 may reflect the display light 30 from the illumination device 28 toward the glare mitigation module 32. In other examples, the illumination device 28, the SLM 50, and the glare mitigation module 32 may be aligned.

The head-up display system 20 may further comprise a pupil replicator 52 arranged to receive the display light 30 emitted from the illumination device 28, replicate the display light 30 into a plurality of display light 30, and transmit the plurality of display light 30 parallel to one another toward the glare mitigation module 32. The pupil replicator 52 may define an input aperture 54 and an output aperture 56 and may comprise a waveguide 58 positioned between the input and output apertures 54, 56. The display light 30 may enter the pupil replicator 52 from the SLM 50 through the input aperture 54 and totally internally reflect within the waveguide 58. As shown in FIG. 1, the output aperture 56 may occupy a surface area that is greater than a surface area of the input aperture 54. The display light 30 totally internally reflects within the waveguide 58, with the reflection scattering the display light 30 across the output aperture 56. The display light 30 then exits the pupil replicator 52 as the plurality of display light 30 across the surface area of the output aperture 56. As such, the pupil replicator 52 expands the area in which the display light 30 from the illumination device 28 may be viewed. More specifically, the surface area of the output aperture 56 is sized and shaped to transmit the plurality of display light 30 to an equivalently sized and shaped eyebox 60. The eyebox 60 is the position of the plurality of display light 30 within the vehicle 22 at which the eyes 24 of the occupant 26 should be positioned. More specifically, the eyebox 60 provides the plurality of display light 30 over a surface area that is equivalent to the output aperture 56 of the pupil replicator 52. The surface area allows for deviations in the positioning of the eyes 24 of the occupant 26 (such as variations in the size of different occupants 26, variations in the positioning of the occupant 26, and general movement of the occupant 26, just to name a few) while maintaining the transmission of the display light 30. The projection of the plurality of display light 30 across the eyebox 60 ensures that the information within the display light 30 is continuously transmitted to the occupant 26 (i.e., preventing the information from alternating between being visible and not visible due to variations in the positioning of the occupant 26).

Figure 9:
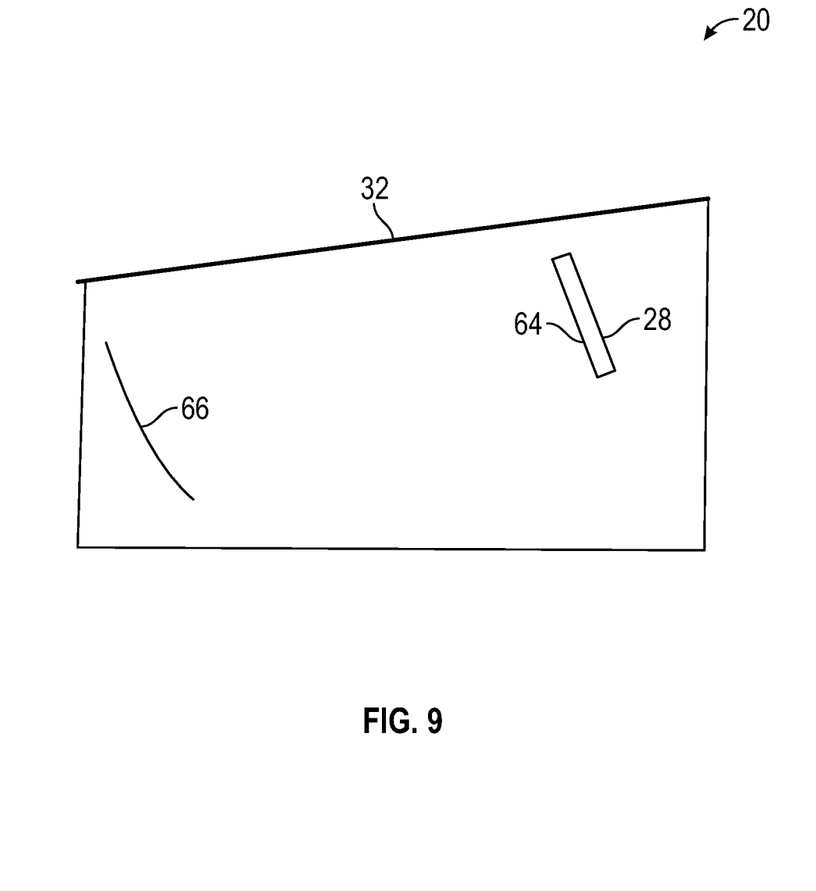

In the example shown in FIG. 1, the illumination device 28 is further defined as a laser 62, with the display light 30 emitted by the laser 62 being coherent. However, the illumination device 28 may be any component suitable of emitting the display light 30, such as a light emitting diode. In one example shown in FIG. 9, the illumination device 28 is further defined as a picture generation unit 64. The picture generation unit 64 emits the display light 30 (with the information embedded therein) toward a mirror 66. The mirror 66 reflects the display light 30 toward the glare mitigation module 32. The display light 30 transmits through the glare mitigation module 32. The display light 30 may then reflect off of the windshield 48 and toward the eyes 24 of the occupant 26. In one example, the picture generation unit 64 is further defined as a liquid crystal display. In another example, the picture generation unit 64 is further defined as a digital light processing projector.

In the example shown in FIG. 1, the glare mitigation module 32 is positioned adjacent the pupil replicator 52, with the display light 30 transmitted from the pupil replicator 52 and into the glare mitigation module 32. In this example, the glare mitigation module 32 is sized to cover the entire output aperture 56 of the pupil replicator 52 such that all of the plurality of display light 30 transmits through the glare mitigation module 32.

In one example, the input surface 34 and the output surface 36 are substantially parallel. Moreover, each of the input and output surfaces 34, 36 may have a planar configuration. Accordingly, the glare mitigation module 32 may be flat. In the example shown in FIGS. 2 and 3, the layers 42 extend substantially parallel to one another and the input and output surfaces 34, 36. As such, the layers 42 may be evenly stacked between the input and output surfaces 34, 36. It is to be appreciated that the input and output surface 34, 36 and the layers 42 may be non-parallel in other examples not explicitly shown in the Figures and may achieve the desired transmission of the display light 30 therethrough and diffraction of the external light 44.

In one example, the layers 42 of the diffractive optical element 40 comprise a polymer that is transparent at visible wavelength and configured to transmit light therethrough. However, the diffractive optical element 40 may comprise glass or any other material suitable for transmitting light therethrough.

In the example shown in FIG. 2, the layers 42 are formed separately and assembled successively to form the diffractive optical element 40. More specifically, the layers 42 may be formed into solid components that are then stacked upon one another in a laminate configuration. Moreover, the adjacent layers 42 may be bonded to one another with an optically clear adhesive 68 having a refractive index substantially equal to an average refractive index of the diffractive optical element 40. As such, the adhesive 68 is configured to bond the layers 42 without significantly altering the optical properties of the layers 42 and the diffractive optical element 40 as a whole. Alternatively, the layers 42 of the diffractive optical element 40 may be integrally formed of a unitary material. In the example shown in FIG. 3, the layers 42 of the diffractive optical element 40 are integrally formed of the unitary material, with the unitary material comprising a photopolymer. Each of the layers 42 may be independently processed to form the diffractive optical element 40. More specifically, the photopolymer may be dispensed as a liquid equivalent to one layer 42 and then processed to form the solidified layer 42. The next adjacent layer 42 may be formed by dispensing the liquid photopolymer onto the solidified layer 42 and then processed to a solid. This process may be repeated successively until each layer 42 is formed. Curing may be facilitated by exposing the liquid photopolymer to light. Moreover, variations in properties of the light may result in variations in optical properties of the layers 42, which is described in greater detail below.

Figure 4:
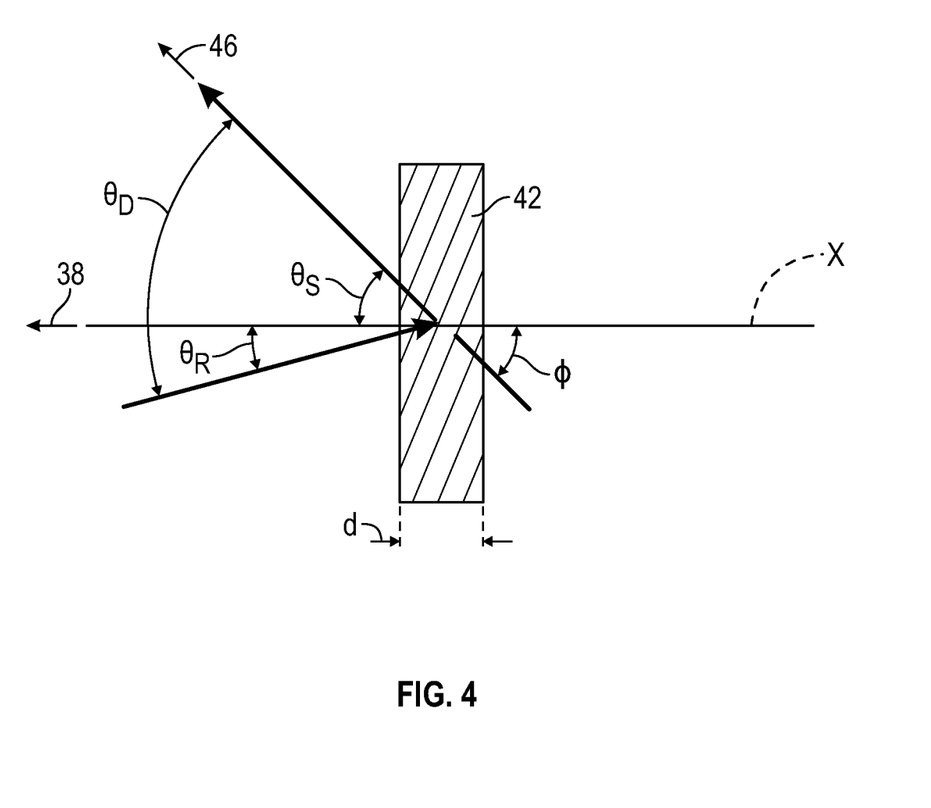
FIG. 4 is a cross-sectional view of one layer of the glare mitigation module and showing the display and external lights interacting with the layer.

Each of the plurality of the layers 42 may be arranged to have a diffraction angle θD and configured to interact with the external light 44 entering the glare mitigation module 32 within a range of incident angles θR and diffract the external light 44 within a range of diffraction angles θs, as shown in FIG. 4. The angle θD refers to the angle between the direction of the incident light beam (i.e., the angle of the external light 44 entering the glare mitigation module 32) and the resulting diffracted beam (i.e., the diffracted external light 44). More specifically, the diffraction mitigation module defines an axis X normal to the output surface 36. The angle θD is a composite of the incident angle θR and the diffraction angle θs. Both the incident angle θR and the diffraction angle θs are measured from the axis X. The angle θD is determined based upon the range of incident angles θR which the external light 44 may transmit onto the glare mitigation module 32 and result in a reflection toward the eyebox 60 that causes glare to the occupant 26. The diffraction angle θs is then determined to redirect the light outside of eyebox 60. The output surface 36 may comprise an anti-reflection coating 70 to ensure the external light 44 enters the layers 42 of the glare mitigation module 32, as shown in FIGS. 2 and 3.

Each of the plurality of layers 42 may vary from the other layers 42 in at least one of a grating angle φ, a periodicity ∧, a refractive index modulation Δn, and a thickness d. More specifically, each of the layers 42 are formed independently with their own grating angle φ, periodicity ∧, refractive index modulation Δn, and thickness d to achieve a Bragg angle that is the same as the incident angle θR of external light 44 and at a desired range of wavelength λ. More specifically, each of the layers 42 are configured to correspond with a different range of the wavelength λ within the visible spectrum. The layers 42 collectively interact with the entire visible spectrum. The layers 42 redirect the external light 44 to outside of eyebox 60 in the same direction, avoiding a rainbow appearing as a visual artifact. FIGS. 2 and 3 show examples of a layout for the layers 42 of the glare mitigation module 32. FIGS. 2 and 3 demonstrate that any number of layers 42 may be utilized, with each of the layers 42 corresponding to different portion of the visible wavelength λ between 400 nm and 700 nm. More specifically, the number "N" of layers 42 is governed by:

$$N = \frac{(700 - 400)}{\Delta \lambda}$$

Where Δλ is the range of wavelength λ corresponding to each layer 42. In FIGS. 2 and 3, the layer 42 adjacent the output surface 36 (labeled "Layer 1") corresponds to wavelengths A of the external light 44 from about 400 nm to about (400+Δλ) nm (with the center wavelength λ defined as: 400+Δλ/2 nm). The next adjacent layer 42 (labeled "Layer 2") corresponds to wavelengths A of the external light 44 from about (400+Δλ) nm to about (400+2Δλ) nm (with the center wavelength λ defined as: 400+3Δλ/2 nm). The layers 42 progressively cover the portions of the wavelength λ of the external light 44. The layer 42 adjacent the input surface 34 (labeled "Layer N") corresponds to wavelengths A of the external light 44 from about (700−Δλ) nm to about 700 nm (with the center wavelength λ defined as: 700−Δλ/2 nm).

FIG. 4 shows an example of a demonstrative external light 44 interacting with one of the layers 42. More specifically, FIG. 4 shows the external light 44 transmitting toward the layer 42 at the incident angle θR and diffracting away from the layer 42 at the diffraction angle θs. FIG. 4 also shows the grating angle φ of the layer 42, which facilitates diffraction of the external light 44 at the diffraction angle θs. In one example, the grating angle φ of the layer 42 is from about 90 degrees to about 180 degrees. In one example, the thickness d of the layer 42 is from about 10 μm to about 100 μm. In another example, the thickness d of the layer 42 is from about 50 μm to about 70 μm. In one example, the periodicity ∧ of the layer 42 is from the operation wavelength λ to 10 μm. In another example, the periodicity ∧ of the layer 42 is from the operation central wavelength λ to 2 μm. In one example, the ratio between the periodicity ∧ and the central wavelength λ is from about 3:1 to about 1:1. In one example, the refractive index of the material is from about 1.4 to about 1.8.

Figure 5:
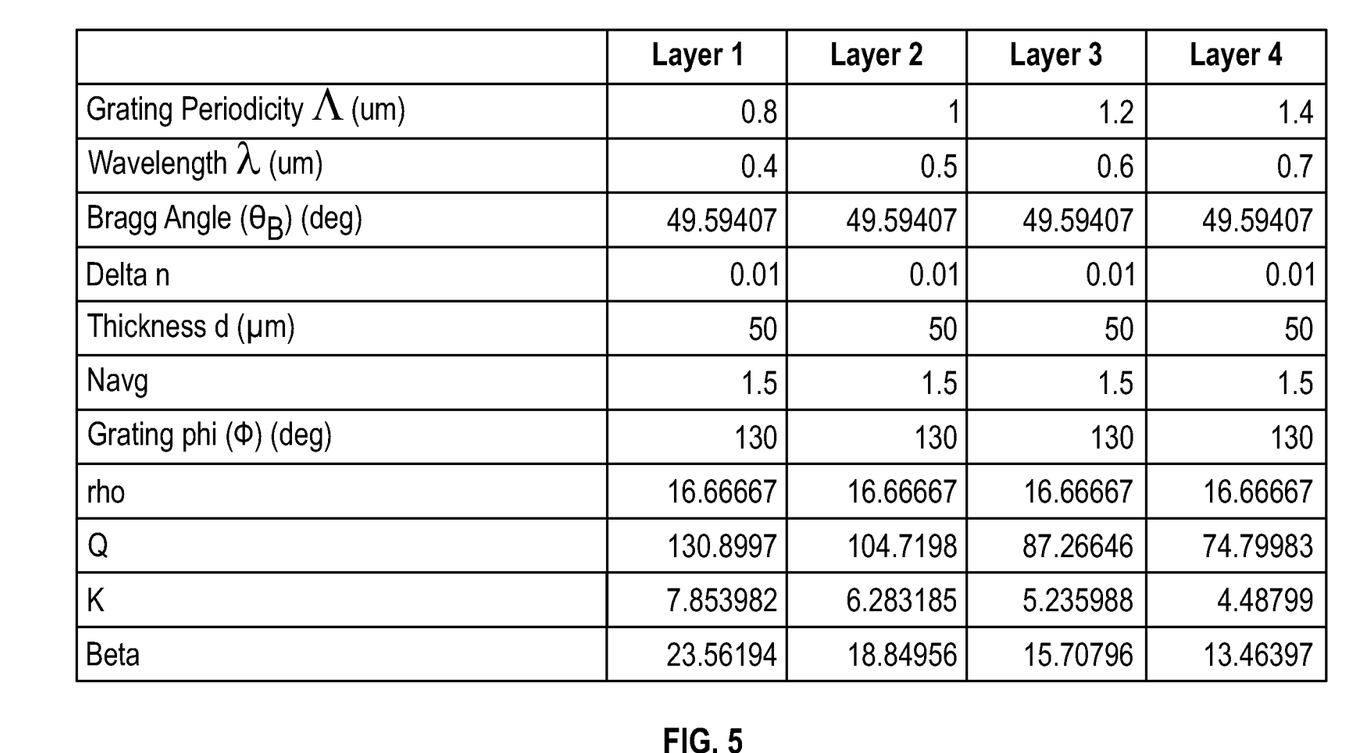
FIG. 5 is a table corresponding to one example of the glare mitigation module comprising four layers and showing properties of the layers.

FIG. 5 shows a table corresponding to one example of the glare mitigation module 32 comprising four layers 42. Properties of the four layers 42 are shown in the table. Notably, the grating angle φ, the refractive index modulation Δn, and the thickness d are the same between the layers 42. The periodicity ∧ varies between the layers 42, which facilitates the reflection of specific wavelengths A at the diffraction angle θs.

Figure 6:
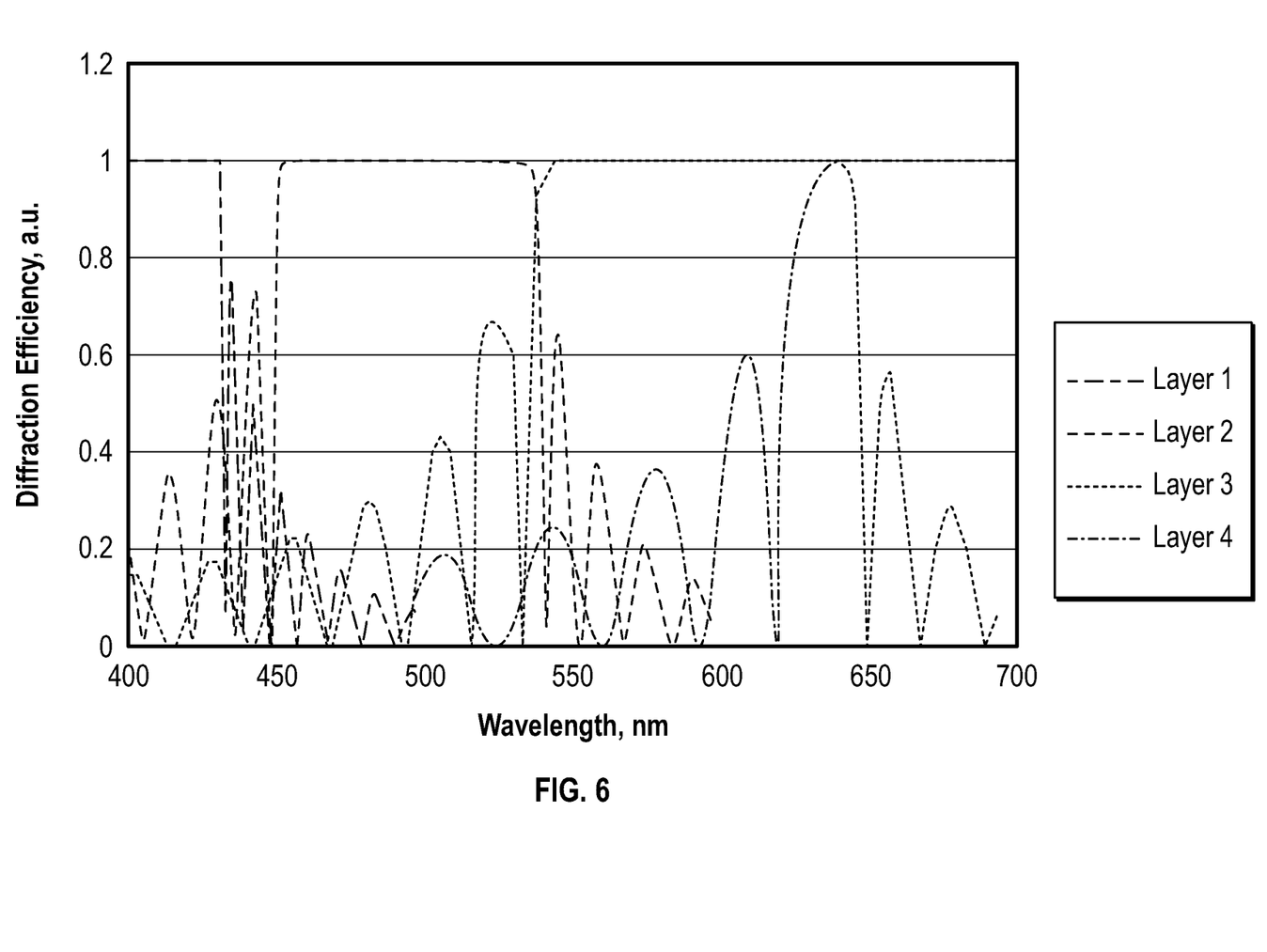
FIG. 6 is a graph showing the diffraction efficiency of each layer of the glare mitigation module of FIG. 5, relative to the wavelength of the external light between 400 nm and 700 nm.
Figure 7:
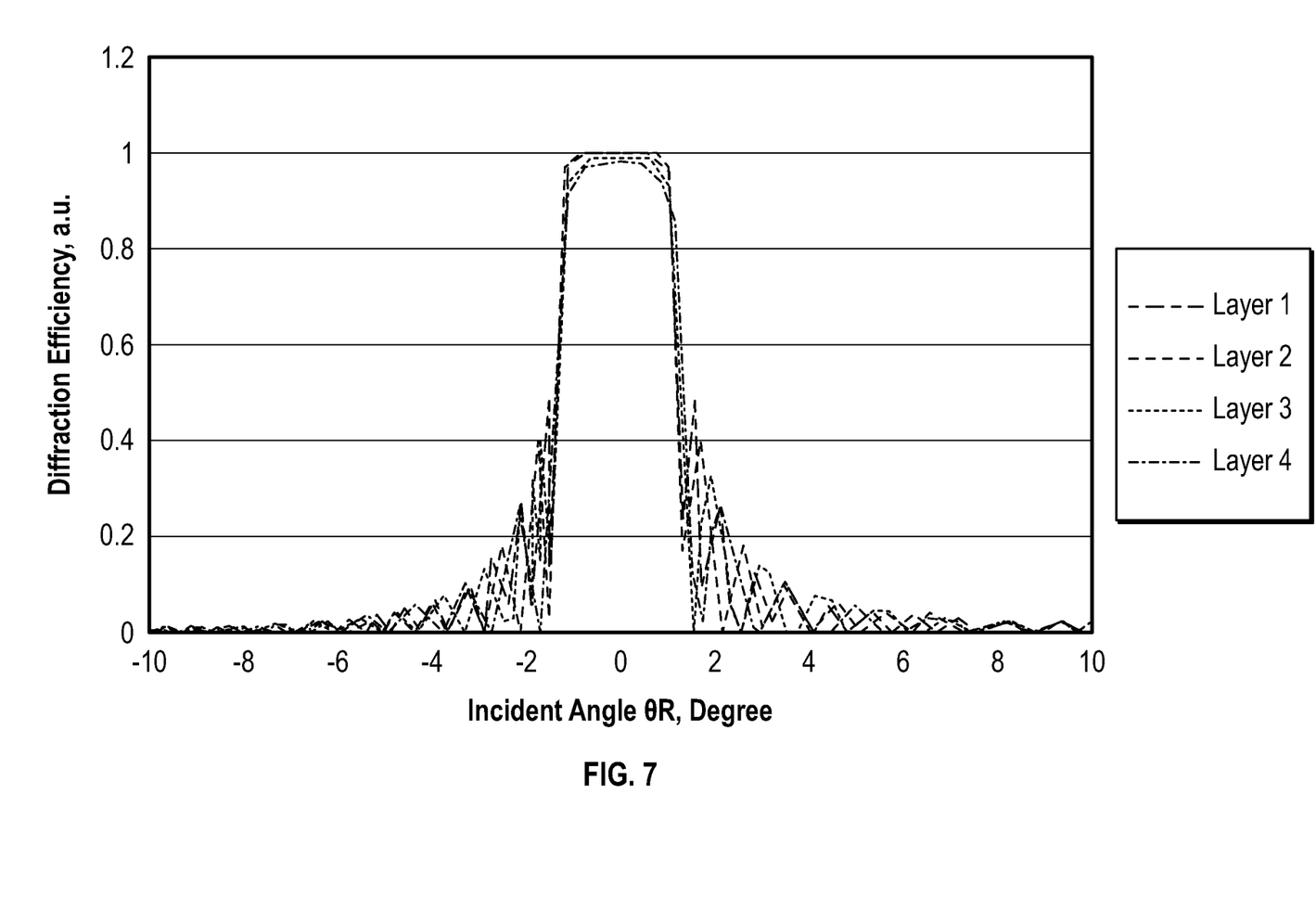
Figure 8:
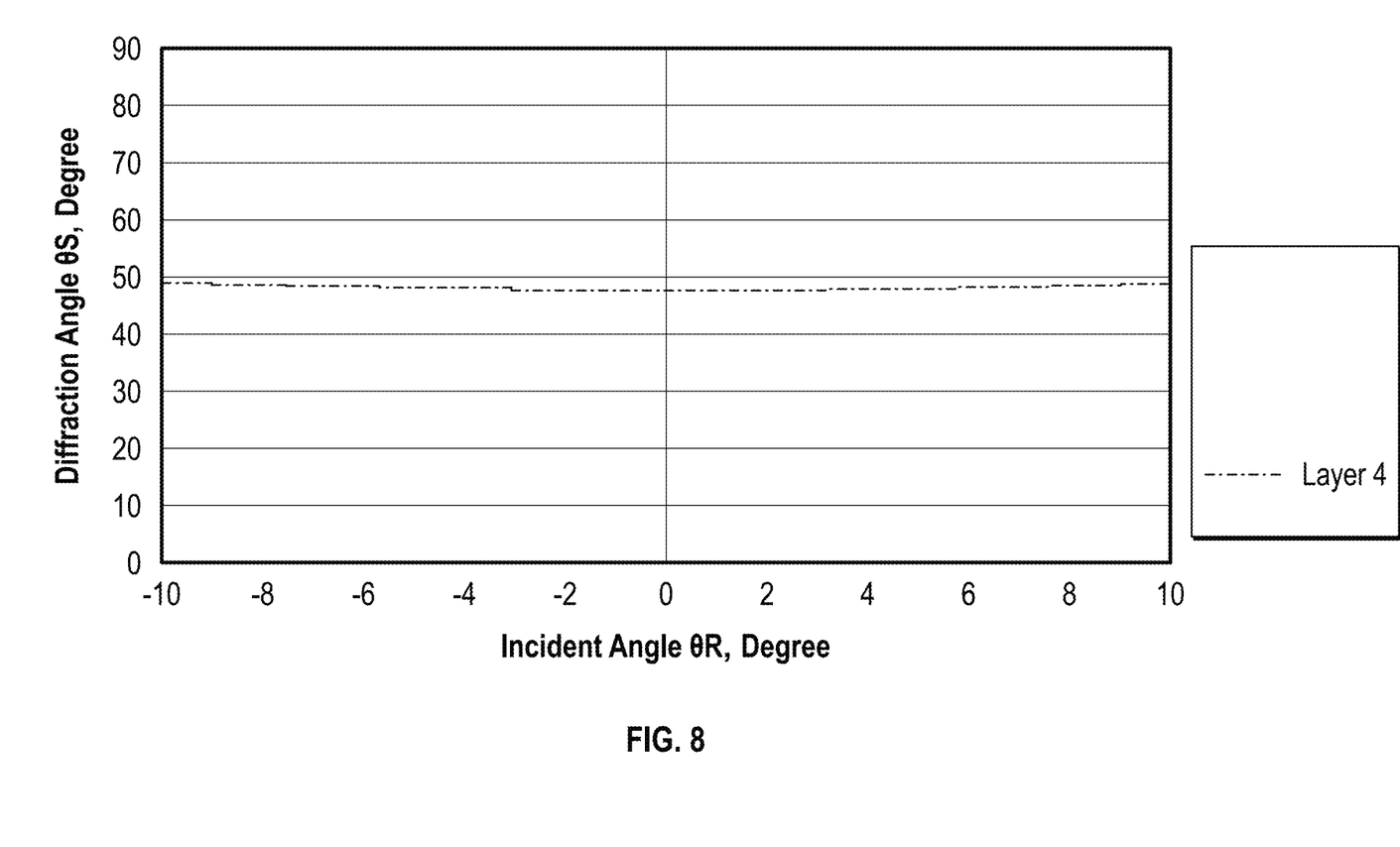

FIGS. 6-8 show graphs corresponding to the example in the table in Figure) XX. FIG. 6 shows the diffraction efficiency of each layer 42 relative to the wavelength λ of the external light 44 between 400 nm and 700 nm. More specifically, FIG. 6 shows that the layers 42 produce about 100 percent diffraction efficiency over different portions of the wavelength λ, and collectively produce about 100 percent diffraction efficiency over the majority of the wavelength λ. FIG. 7 shows the diffraction efficiency of each layer 42 relative to the incident angle θR of the external light 44 that the glare mitigation module 32 was designed for. FIG. 7 shows that each of the layers 42 produce about 100 percent diffraction efficiency to about 2 degrees variation from the designed incident angle θR in either direction, with progressive reduction in diffraction efficiency out to about 10 degrees variation in either direction. FIG. 8 shows the diffraction angle θs of the external light 44 for each layer 42 relative to the incident angle θR of the external light 44 that the glare mitigation module 32 was designed for. FIG. 8 shows that the diffraction angle θs stays substantially the same out to about 10 degrees variation in either direction of the incident angle 8R. As such, the incident angle 8R of the external light 44 may vary by at least 20 degrees without significantly altering the diffraction angle θs of the external light 44. Said differently, the glare mitigation module 32 diffracts the external light 44 outside of the eyebox 60 for a range of positions of the source of the external light 44.

Accordingly, the head-up display system 20 offers several advantages. The glare mitigation module 32 diffracts the external light 44 away from the eyes 24 of the occupant 26 to ensure that the information within the display light 30 is clear and visible to the occupant 26. Furthermore, the planar configuration of the glare mitigation module 32 reduces the packaging size of the head-up display system 20 compared to previous curved lens. The reduced packaging size reduces size and location conflicts with other components of the vehicle 22.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A glare mitigation module for use with a head-up display system and configured to transmit display light emitted from an illumination device therethrough, the glare mitigation module comprising:
    an input surface through which the display light from the illumination device enters the glare mitigation module;
    an output surface through which the display light from the illumination device exits the glare mitigation module in a display direction; and
    a diffractive optical element comprising a plurality of layers stacked successively between the input and output surfaces, with the plurality of layers arranged to transmit the display light of the illumination device therethrough and to diffract an external light that enters the glare mitigation module through the output surface, wherein the diffractive optical element is arranged to diffract the external light in a diffracted direction away from eyes of an occupant, and wherein for each of the plurality of layers a thickness is about 10 μm, a ratio between a periodicity λ and a central wavelength λ is from 3:1 to 1:1, and a refractive index is from 1.4 to 1.8.

2. The glare mitigation module of claim 1, wherein each of the plurality of layers varies from the other layers in all of a grating angle, a periodicity, a refractive index modulation, and a thickness.

3. The glare mitigation module of claim 1, wherein the input surface and the output surface are substantially parallel.

4. The glare mitigation module of claim 3, wherein each of the input and output surfaces has a planar configuration.

5. The glare mitigation module of claim 3, wherein the layers extend substantially parallel to one another and the input and output surfaces.

6. The glare mitigation module of claim 1, wherein the layers of the diffractive optical element comprises a polymer that is transparent at visible wavelength.

7. The glare mitigation module of claim 1, wherein the layers of the diffractive optical element are integrally formed of a unitary material.

8. The glare mitigation module of claim 7, wherein the unitary material comprises a photopolymer, with each of the layers within the unitary material independently processed to form the diffractive optical element.

9. The glare mitigation module of claim 1, wherein the layers are formed separately and assembled successively to form the diffractive optical element.

10. The glare mitigation module of claim 9, wherein adjacent layers are bonded to one another with an optically clear adhesive having a refractive index substantially equal to an average refractive index of the diffractive optical element.

11. A head-up display system of a vehicle for visually transmitting information to eyes of an occupant, comprising:
    an illumination device configured to emit a display light; and
    a glare mitigation module spaced from the illumination device and configured to transmit the display light from the illumination device therethrough, the glare mitigation module comprising:
        an input surface through which the display light from the illumination device enters the glare mitigation module;
        an output surface through which the display light from the illumination device exits the glare mitigation module in a display direction; and
        a diffractive optical element comprising a plurality of layers stacked successively between the input and output surfaces, with the plurality of layers arranged to transmit the display light of the illumination device therethrough and to diffract an external light that enters the glare mitigation module through the output surface, wherein the diffractive optical element is arranged to diffract the external light in a diffracted direction away from the eyes of the occupant for preventing reflection of the external light toward the eyes of the occupant, and wherein for each of the plurality of layers a thickness is about 10 μm, a ratio between a periodicity λ and a central wavelength λ is from 3:1 to 1:1, and a refractive index is from 1.4 to 1.8.

12. The head-up display system of claim 11, further comprising a spatial light modulator proximate the illumination device and arranged to receive the display light emitted from the illumination device, impose a holographic image on the display light, and transmit the display light toward the glare mitigation module.

13. The head-up display system of claim 11, further comprising a pupil replicator arranged to receive the display light emitted from the illumination device, replicate the display light into a plurality of display lights, and transmit the plurality of display lights parallel to one another toward the glare mitigation module, and wherein the glare mitigation module is sized to cover an entire output aperture of the pupil replicator such that all of the plurality of display lights transmit through the glare mitigation module.

14. The head-up display system of claim 11, further comprising a windshield spaced from the glare mitigation module extending transverse to the display direction of the display light exiting the glare mitigation module to reflect the display light toward the eyes of the occupant.

15. The head-up display system of claim 11, wherein the illumination device is further defined as a laser, with the display light emitted by the laser being coherent.

16. The head-up display system of claim 11, wherein each of the plurality of the layers is arranged to have a diffraction angle and configured to interact with the external light entering the glare mitigation module within a range of incident angles and diffracts the external light within a range of diffraction angles.

17. The head-up display system of claim 16, wherein each of the plurality of layers varies from the other layers in at least one of a grating angle, a periodicity, a refractive index modulation, and a thickness.

18. A head-up display system of a vehicle for visually transmitting information to eyes of an occupant, comprising:
an illumination device configured to emit a display light; and
a glare mitigation module spaced from the illumination device and configured to transmit the display light from the illumination device therethrough, the glare mitigation module comprising:
an input surface through which the display light from the illumination device enters the glare mitigation module;
an output surface through which the display light from the illumination device exits the glare mitigation module in a display direction; and
a diffractive optical element comprising a plurality of layers stacked successively between the input and output surfaces, with the plurality of layers arranged to transmit the display light of the illumination device therethrough and to diffract an external light that enters the glare mitigation module through the output surface, wherein the diffractive optical element is arranged to diffract the external light in a diffracted direction for preventing reflection of the external light toward the eyes of the occupant;
a spatial light modulator proximate the illumination device and arranged to receive the display light emitted from the illumination device, impose a holographic image on the display light, and transmit the display light toward the glare mitigation module; and
a windshield spaced from the glare mitigation module extending transverse to the display direction of the display light exiting the glare mitigation module to reflect the display light toward the eyes of the occupant;
wherein each of the plurality of the layers is arranged to have a diffraction angle and configured to interact with the external light entering the glare mitigation module within a range of incident angles and reflect the external light within a range of diffraction angles; and
wherein each of the plurality of layers of the diffractive optical element are integrally formed of a unitary material comprising a photopolymer, with each of the plurality of layers independently processed to form the diffractive optical element, and wherein for each of the plurality of layers a thickness is about 10 μm, a ratio between a periodicity $\lambda$ and a central wavelength $\lambda$ is from 3:1 to 1:1, and a refractive index is from 1.4 to 1.8.

19. The head-up display system of claim 18, further comprising a pupil replicator arranged to receive the display light emitted from the illumination device, replicate the display light into a plurality of display light, and transmit the plurality of display light parallel to one another toward the glare mitigation module.

* * * * *